United States Patent [19]
Schaefers

[11] Patent Number: 5,961,607
[45] Date of Patent: *Oct. 5, 1999

[54] SYSTEM FOR TRANSMISSION OF DATA FLOW IN DATA COMMUNICATION NETWORKS

[75] Inventor: Ludger Schaefers, Hirschberg, Germany

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/656,351

[22] PCT Filed: Jun. 7, 1995

[86] PCT No.: PCT/EP95/02186

§ 371 Date: Jun. 11, 1996

§ 102(e) Date: Jun. 11, 1996

[87] PCT Pub. No.: WO96/13924

PCT Pub. Date: May 9, 1996

[30] Foreign Application Priority Data

Oct. 31, 1994 [DE] Germany .............................. 44 38 522

[51] Int. Cl.⁶ .............................. H04L 29/06; G06F 15/17
[52] U.S. Cl. .......................... 709/249; 709/238; 709/230; 455/432
[58] Field of Search ............................ 395/200.79, 200.6, 395/200.61, 200.62, 200.5, 200.51, 200.52, 200.57, 200.58, 200.68; 455/432, 433, 434

[56] References Cited

U.S. PATENT DOCUMENTS

| | | | |
|---|---|---|---|
| H1641 | 4/1997 | Sharman | 379/60 |
| 5,159,592 | 10/1992 | Perkins | 370/338 |
| 5,325,362 | 6/1994 | Aziz | 370/405 |
| 5,423,002 | 6/1995 | Hart | 395/200.79 |
| 5,442,633 | 8/1995 | Perkins et al. | 370/331 |
| 5,457,680 | 10/1995 | Kamm et al. | 370/17 |
| 5,515,509 | 5/1996 | Rom | 395/200.1 |
| 5,533,026 | 7/1996 | Ahmadi et al. | 370/349 |
| 5,598,536 | 1/1997 | Slaughter, III et al. | 395/200.16 |
| 5,636,216 | 6/1997 | Fox et al. | 370/402 |
| 5,655,140 | 8/1997 | Haddock | 395/200.79 |
| 5,708,655 | 1/1998 | Toth et al. | 370/310 |
| 5,732,074 | 3/1998 | Spaur et al. | 370/313 |

FOREIGN PATENT DOCUMENTS

| | | | |
|---|---|---|---|
| 0432924 | 6/1991 | European Pat. Off. | G06F 13/12 |
| 0483547 | 5/1992 | European Pat. Off. | H04L 12/56 |
| 9116679 | 10/1991 | WIPO | G06F 13/00 |

OTHER PUBLICATIONS

Microsoft Press Computer Dictionary Second Edition, Microsoft Press, 1994.

Stallings, "Data and Computer Communications Fourth Edition," Macmillan Publishing Company, pp. 421–470, 1994.

*Primary Examiner*—Mark H. Rinehart
*Assistant Examiner*—Daniel Patru
*Attorney, Agent, or Firm*—Jeanine S. Ray-Yarletts

[57] ABSTRACT

In a system for the transmission of data flow in data communication networks, a special provision is a network integration unit (28), which integrates at least two varying physical networks (24, 25) and allows these networks (24, 25) to appear at the network level as one physical network. With the system in accordance with the invention, the change between different data networks (24, 25) is completely seamless for users in a stationary network or other mobile network subscribers.

12 Claims, 2 Drawing Sheets

SYSTEM FOR TRANSMISSION OF DATA FLOW IN DATA COMMUNICATION NETWORKS

FIELD OF THE INVENTION

The invention pertains to a system for transmitting data flow in data communication networks, for example in cellular networks or in stationary multi-computer networks.

BACKGROUND OF THE INVENTION

In recent years, parallel with the traditional cellular networks for voice communication, there has been an increase in the development of widely-varying cellular networks for the mobile transmission of data. The significance of these networks may be perceived from the fact that some network service providers are already making inter-continental networks available.

These networks, however, present to some degree considerable differences in regard to their underlying technology, their fee structure, and the geographical area which they cover. Beyond this, the network subscriber or network user often requires specific interfaces for individual user programs.

Owing to the existing heterogeneous cellular infrastructure, and since the mobility of today's users frequently dictates that network subscribers go beyond the coverage area of one cellular network and move into the coverage area of another (i.e. the network subscribers "roam"), it is often necessary to operate with varying data-communication networks simultaneously.

Generic transmission systems which only allow specifically-defined communication with a single physical network are already known. In the simplest instance, this type of system consists of a highly-specific applications program interface (API); in the most complex case they provide a standard protocol for data transmission to the user. There is, however, no known system of this type which integrates the varying physical networks under a single standard protocol.

OBJECTS OF THE INVENTION

It is therefore the object of the present invention to provide a generic system which makes it possible for users to be able to select freely between the most varying networks, with as little technical expenditure as possible, and with minimal initial costs for equipment as well as operational costs, in order, for example, to respond to limited geographical coverage areas or to be able to move freely in terms of fees charged.

It is an additional goal that a mobile network subscriber's change from one mobile network to another should remain completely seamless for users in a stationary network or in another mobile network subscriber, in other words, that this change takes place exclusively between a stationary gateway and the mobile subscriber.

SUMMARY OF THE INVENTION

As a solution to achieve this objective, the system in accordance with the invention provides: a user level, through which each network subscriber communicates and which is independent of a particular physical network; a network level possessing a network protocol which is independent of physical networks; a network integration unit, which integrates at least two varying physical networks and allows these networks to appear as one physical network at the network level; and also a network interface, which is configured between the network integration unit and the network level.

Network subscribers may be, for example, stationary or portable data processing equipment or test devices.

The network interface in accordance with the invention is designed as a common interface to all physical wireless networks. This arrangement is characterized first of all through a structural form which is simple to implement technically. In addition, the uniform application of communication protocols is made possible with this system.

Furthermore, the structural configuration in accordance with the invention is characterized by the fact that a network subscriber may still be reached under the same address at the network level after a change of the physical network.

In order to provide the best possible support to network subscribers for their individual applications and in their user areas, the varying mobile data communication networks may be wholly integrated by means of the system in accordance with the invention, and are accessible for user programs from a standardized interface.

With the system in accordance with the invention it can be additionally so provided that the network integration unit is configured below the network level. This architecture makes possible an especially cost-effective structuring of the transmission system.

Furthermore, the system in accordance with the invention can be configured so that the network integration unit provides network attributes which make it possible for the network integration unit to address a network subscriber through varying physical networks. On the basis of this addressing, the varying of physical networks may be easily and efficiently managed.

Furthermore, the system in accordance with the invention can be configured so that a modification of a network attribute takes place automatically by means of a network attribute manager, which in turn operates in accordance with an attribute management protocol and translates the network attribute(s) upon the transition from one network to another. The advantage of this form of execution may be seen in the fact that the network subscriber is required to perform only minimum adjustments, for instance a change in the radio unit, and is hence totally relieved of these activities.

Furthermore, the system in accordance with the invention can be configured so that the network integration unit is implemented as a computer program. In this way, an especially cost-effective implementation of the system is made possible, since no technical-hardware measures are required, but rather only the installation of one or more computer program modules.

Furthermore, the system in accordance with the invention can be configured so that a mobile network subscriber communicates with network subscribers in any number of wireless networks and fixed networks through at least two different wireless networks. In this manner, the wireless networks serve as intermediaries between the mobile network subscribers and the fixed network subscribers.

Furthermore, the system in accordance with the invention can be configured so that the communication between wireless networks and fixed networks is conducted through a gateway. In this manner, several wireless networks and fixed networks can be connected simultaneously to a single gateway. In addition, several network interfaces can be applied simultaneously at one gateway, whereby each of these interfaces forms a logical network. In this way, different user groups can be isolated from one another.

Furthermore, the system in accordance with the invention can be configured so that the protocol of the network level is the so-called Internet protocol. By use of the Internet protocol, the network user is relieved of the necessity of dealing directly with the physical characteristics of the networks through which a data flow is transported, or with those of the paths which the data flow follows on its way to its goal. The advantage of the use of this protocol is to be found above all in the fact that it is a widely-spread standard protocol in the world of open computer communications.

The user should have only one logical view of the network topology. This can be described by an addressing scheme in which a so-called Internet protocol address is assigned to each interface of the network subscriber, for example that of a computer. These addresses typically consist of a so-called "network ID," which designates the network in question, and a so-called "host ID," which designates the host in this network. Configuration of the logical structure on the physical structure takes place during system configuration. Here, the system administrator assigns an Internet protocol address for each network interface to which the computer has access.

In addition, the system administrator establishes the network interfaces through which data packets addressed to computers in other networks are to be sent.

BRIEF DESCRIPTION OF THE DRAWINGS

The essential features of the invention will now be explained through the embodiment examples in the following illustrations, and within the framework of a comparison with the relevant state of the art. Specifically.

DESCRIPTION OF THE PREFERRED EMBODIMENT

Figure 1:
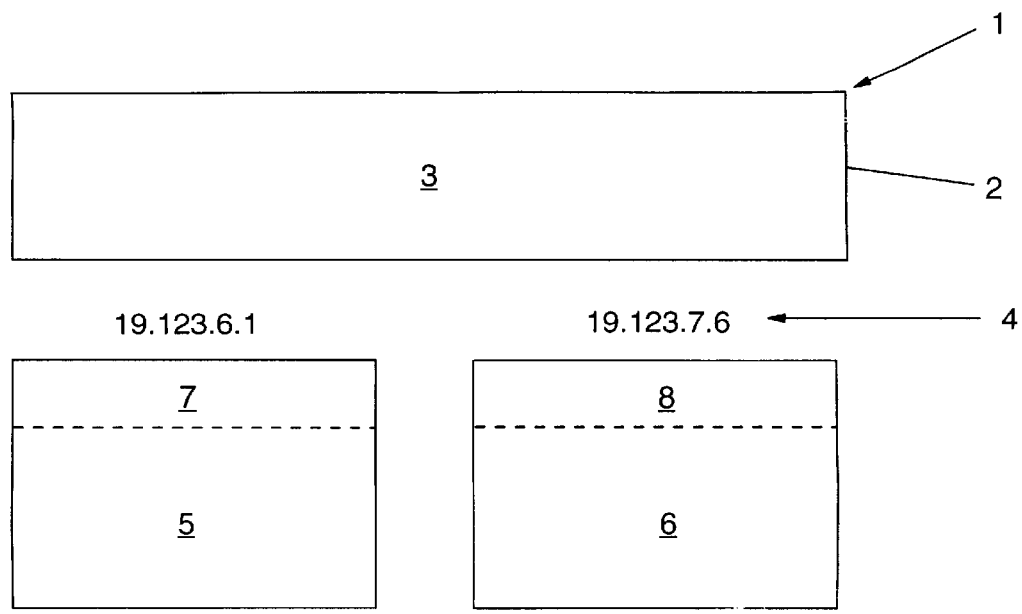
FIG. 1 depicts the functional method of a network integration with a generic device in accordance with the current state of the art.

In FIG. 1, the functional principle of a network integration on the basis of the Internet protocol in accordance with the current state of the art is represented. This protocol has established itself as the standard in open data communications and forms the basis of a world-wide data network, the so-called Internet. Through this definition, the different terminology as well as the concepts may be more clearly discerned and described.

For this purpose, an essential primary concept of the Internet protocol shall be discussed first. The basis of addressing is found in the Internet addresses 4, which consist of four bytes, and which are formed by the network address and the so-called host address. The value of the network and the host portion in the address 4 may be defined through so-called network masks. Such addresses are typically represented as a decimal quadruple, such as 19.123.6.1, whereby each element is the decimal representation of a byte. Each network interface 4 is assigned a unique IP-address. Generally, a computer retains several network interfaces of this kind, for example one for communication through a token ring 5, one for communication with an Ethernet 6, etc.

FIG. 1 describes a situation with two such interfaces 7, 8. The networks 5, 6 in each case as well as their interfaces 7, 8 are a portion of the physical level, including the corresponding linking protocol. The token ring interface 7 may have as its address, for example, 19.123.6.1, and the interface Ethernet may have the address 19.123.7.6, whereby in each instance the first three bytes represent the network address, and the host address consists only of the last byte. When addressing another computer, network level 3 (IP-level) decides which network interface is to be selected, based on "consistent network addresses" (i.e. having the first 3 bytes the same). In the case of a computer with the IP-address 19.123.6.128, the IP-level selects the token ring interface, since the network addresses of the token ring interface and that of the computer to be addressed are consistent.

This example makes it clear that Internet addresses represent the "physical topology" of the computer linking in each case, since with a changing of the physical linking of a computer, for example, with a change from token ring 5 to Ethernet 6, its IP-address (not represented) is also always changed. This required change of the IP-address is independent of whether the IP-level 3 is able to administrate so-called "routing tables," which direct IP-data flows through a third computer as necessary.

It should be added that the application levels (not represented here) in each instance are linked through the corresponding IP-levels 3. It is through these application levels that individual network users are linked with the transmission devices.

Figure 2:
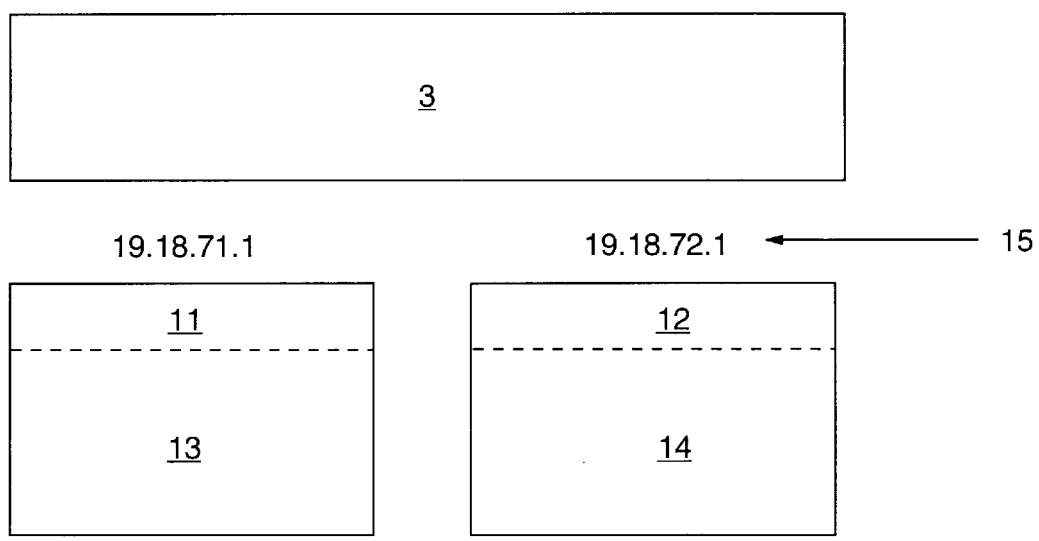
FIG. 2 depicts a network change in accordance with current state of the art.

It shall now be clarified, based on FIG. 2, how the movement of a network (i.e. roaming of the subscriber) subscriber from one physical network to another network is implemented in accordance with the current state of the art, that is, without an integrating network interface.

In this structure, the fixed side possesses multiple network interfaces 11, 12, and specifically one interface for each participating physical network 13, 14. Each of these interfaces possesses its own IP-address 15 and implements the mapping of the IP-protocol onto exactly one physical network 13, 14.

In order to better describe the necessary processes, let it be assumed that a MOBITEX interface 11 with the IP-address 19.18.71.1 and a MODACAM interface 12 with the IP-address 19.18.72.1 are employed. For these addresses 15, the first three components represent in each instance a network address.

For communication with a mobile unit through the MOBITEX network 13, the mobile interface (not represented) shall possess the IP-address 19.18.71.10. Corresponding to the addressing mechanisms as described above, the communication between an application in a stationary network and the mobile data terminal will be conducted through the MOBITEX network interface 11, since the network address of the MOBITEX interface is consistent with the mobile IP-address in the first three quadruples.

Upon a change of networks from MOBITEX 13 and over to MODACOM 14, an action must be performed on the stationary side so that communication will be conducted through the MODACOM network interface 12 from this point. In accordance with the addressing principles in the Internet protocol 3, this can only be achieved through a change in the IP-address of the mobile unit. This has as a consequence, however, that the mobile unit changes its identity in the sense of the Inter net protocol 3, that is, for communication with the mobile unit, applications in the fixed network must use another IP-address, which conforms to the MODACOM interface 12 in accordance with the previous examples, for example, to the address 19.18.72.10. In this case, a change of the network 13, 14 is no longer seamless for the application in the fixed network or for the other mobile network subscribers.

Figure 3:
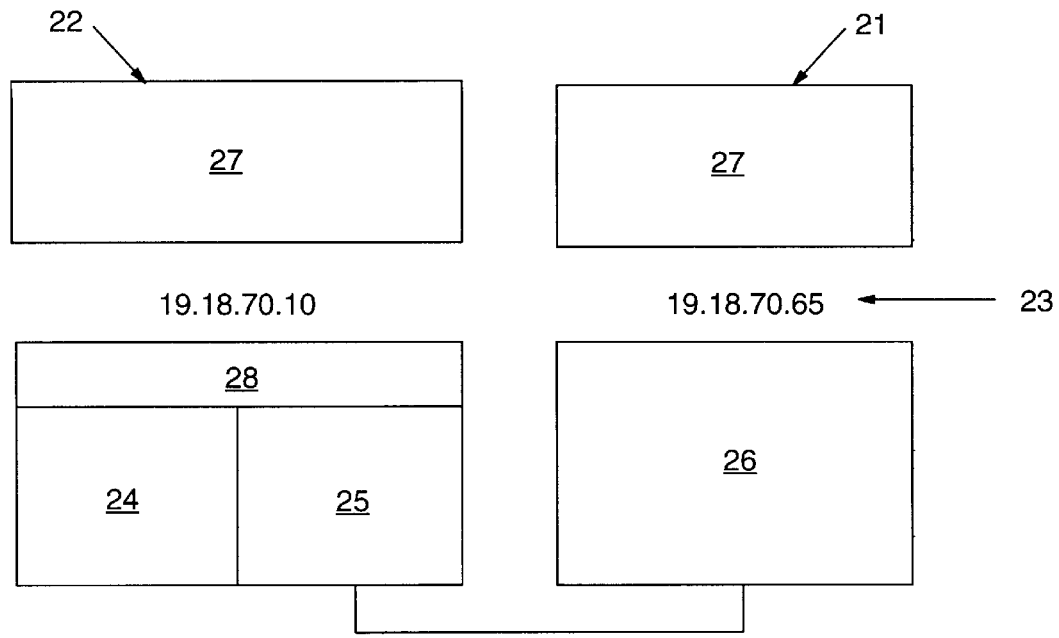
FIG. 3 depicts the communication of an application in a mobile unit with an application in a stationary network in accordance with an embodiment of the invention.

FIG. 3 describes the mechanisms in accordance with the invention for communication of one application on a mobile unit 21 with an application, in a fixed network 22 through the network interface 23 and network integration unit 28 presented here. Based on this illustration, the possibilities of seamless roaming between different networks 24, 25 will be made clear.

For this purpose, let it be assumed that the mobile terminal unit 21 may currently be reached through a mobile MODACOM network 25, 26. The network interface 23 on the fixed side 22 shall have the IP-address 19.18.70.10; and the mobile terminal unit 21 shall have the address 19.18.70.65, whereby in each instance the first three bytes represent the network address, so that upon addressing of the mobile unit 21, the IP-level 27 transfers the data to be transmitted together with the IP-address information 23 to the network, interface.

At this point-in contrast to customary network interfaces-no immediate linking onto a single physical network 24, 25 or 26 takes place, but rather in an initial step the physical network is first selected, through which the mobile terminal unit 21 can be reached. In this case, it is the MODACOM network 25, 26.

It is not until a second step that the linking to the selected physical network 24 or 25 takes place. Hence, in the case of the MODACOM network 25, the MODACOM-specific address information or network attributes of the so-called logical link identifier (LLI), the X25 address of the radio network gateway (RNG), together with MODACOM-specific authenticating information, are determined and communication is conducted with these linking parameters through the MODACOM network 25.

The selection of the "active" physical network can be controlled in a differing manner for each mobile terminal unit 21. In the most simple case, this is performed by the system administrator, who conducts the change from one physical network to another through input into configuration files or similar procedures. However, due to the explicit transactions required by the administrator, a different procedure is to be preferred.

The basis for this procedure (i.e. enabling the automatic change to the new address) is a minimal attribute management protocol between the network interfaces on the fixed and on the mobile sides. For this, when the mobile unit is switched on or upon activation of the communication units in question, for instance a MODACOM cell modem interfacing to MODACOM network 26, a MOBITEX cell modem or a GSM hand-held phone, the mobile side 21 automatically communicates to the network intergration unit 28 on the fixed side 22, telling the network integration unit 28 through which physical network 24, 25, and in what manner it is to be reached.

If the user of the mobile terminal unit 21 should now leave the coverage area of the MODACOM network 25,26 (in Germany, for example) and move into an area covered by a MOBITEX network 24, in The Netherlands for example, this is completely seamless for the application on the mobile side 21, as well as on the fixed side 22. This is demonstrated by the following discussion of procedures and protocols.

In an initial step, the user on the mobile side 21 activates his MODACOM tell unit 26 and the corresponding network interface 23. Upon activation of the network interface 23 on the mobile side 21, a minimal attribute management protocol is run to the network integration unit 28 on the fixed side 22, with which the network integration unit 28 on the fixed side 22 is informed of the change of the physical network from MODACOM 25 to MOBITEX 24. It is critical here that the IP-addresses of the participating network interfaces 23, and especially the one located on the mobile side, are not changed in any manner, so that the change of the physical network 24, 25 remains completely invisible for the IP-protocols 27 and all levels lying beyond (i.e. above) it.

Figure 4:
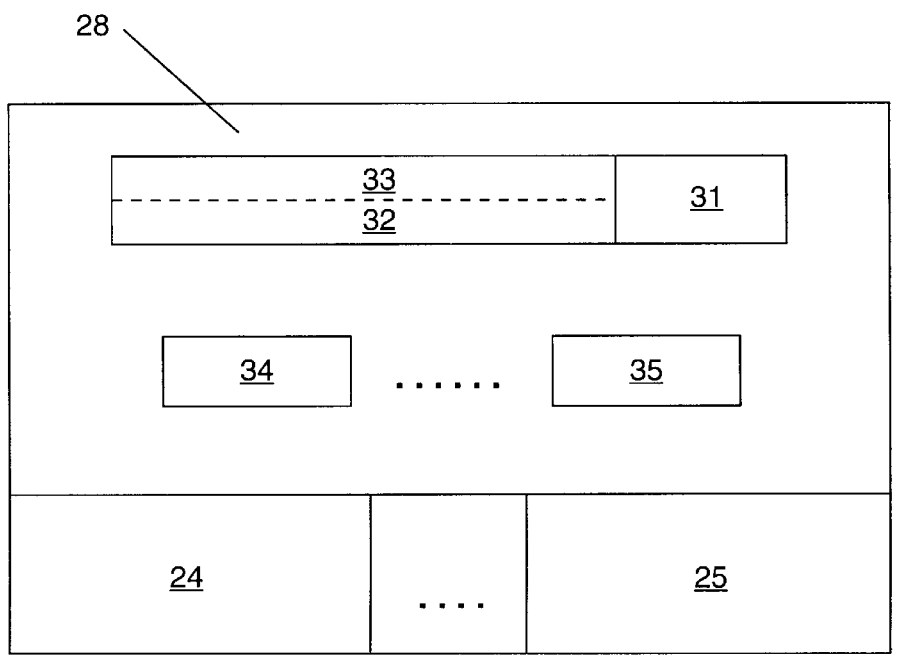
FIG. 4 depicts the structure and functional method of the network integration unit in accordance with the invention.

In FIG. 4, the architecture and the functioning method of the network integration unit 28 are represented. For this, it is again assumed that the mobile unit has the IP-address 19.18.70.65, and may be reached at this time through the MODACOM network 25. This information is managed in the network integration unit 28 in the form of a network attribute by network attribute manager 31. Along with this information on the active network, other network attributes are managed here as well, such as address information for all of the physical networks for which the mobile unit is actually registered.

Using to this attribute assigment, a flow-control 32 conducts the IP-data flow through the physical MODACOM network 25 to this mobile unit, whereby the MODACOM address network attributes for MODACOM-specific addressing are used.

If the mobile unit leaves the covered area of the MODACOM network or changes for other reasons to a MOBITEX network, an authentication can be achieved by the authentication component 33 of network integration unit 28 upon the first linking attempt by use of a password. After successful authentication, the individual network attributes are modified by the network attribute manager 31 in such a manner that MOBITEX is designated as the new active physical network, with the appropriate address information. After this, the flow control 32 conducts the IP-data flow correspondingly through the MOBITEX network 24.

If the mobile unit should go into an area not covered by any network, the flow control 32 informs the network attribute manager 31 of this through a corresponding return acknowledgment of the physical networks, so that the active network is undefined, and the flow control 32 disables the IP-data flow to the mobile unit entirely. In a similar manner, the flow control 32 possesses the capability, after an extended passive period of the mobile unit, of not regarding it as active until a new authentication is made.

So-called adapter modules 34, 35 serve for adaptation of flow control 32 to the different physical networks, making a uniform internal interface available upstream, and which however use specific API's of the physical networks downstream.

The over-all architecture of the network integration unit grants a high degree of flexibility and expandability of the system in accordance with the invention.

Beyond this, the functioning methods of the system as well as the interaction of the structural components which make it up are an objective of the invention.

The corresponding procedures were described in detail in the preliminary description.

I claim:

1. A system for transmission of data flow in data communication networks having a plurality of different physical networks, comprising:

a network layer in a communications protocol stack, said
network layer having a network layer protocol associated therewith, wherein said network layer and said
network layer protocol are independent from said plurality of different physical networks;

a network integration unit which integrates at least two
different ones of said different physical networks and
which allows said at least two different ones to appear
to the network layer as a single physical network, said
network integration unit residing below said network
layer in said communications protocol stack;

a network interface which is configured between the
network integration unit and the network layer;

a stationary network unit, wherein said network layer, said
network integration unit, said network interface, and
said communications protocol stack are located in said
stationary network unit;

a mobile network unit, said mobile network unit having a
single network layer address associated therewith, said
network layer address comprised of a network address
portion and a host address portion, wherein said network address portion is associated with a selected one
of said at least two different ones of said different
physical networks;

a plurality of network attributes related to said mobile
network unit, said network attributes comprising said
single network layer address and a currently active one
of said at least two different ones of said different
physical networks;

means operating in said network integration unit for
storing said network attributes in a location accessible
to a network attribute manager component of said
network integration unit; and means operating in said network integration unit for
enabling said mobile network unit to continuously be
addressed through said network interface by said single
network layer address regardless of whether said
mobile network unit remains in said selected one of
said at least two different ones of said different physical
networks which is associated with said network address
portion of said single network layer address.

2. The system as claimed in claim 1 wherein the network
integration unit is implemented as a computer program.

3. The system as claimed in claim 1 wherein two or more
of said at least two different physical networks are different
cellular networks, and wherein said single network layer
address of said mobile network unit enables said mobile
network unit to simultaneously communicate through at
least two different ones of said two or more different cellular
networks with network subscribers in said at least two
different ones of said two or more different cellular networks.

4. The system as claimed in claim 1 wherein an Internet
protocol is used as the network layer protocol, said Internet
protocol utilizing Internet addresses and wherein said single
network layer address is one of said Internet addresses.

5. The system as claimed in claim 4 wherein user programs operating at an application layer above said network
integration unit in said communications protocol stack use
said means for enabling said mobile network unit to continuously be addressed through said network interface by
said single network layer address.

6. A method of providing seamless roaming for a mobile
network unit by enabling said mobile network unit to be
addressed by a single network layer address even though
said mobile network unit changes from a first physical
network to a different physical network, comprising the
steps of:

storing a plurality of network attributes related to said
mobile network unit in a storage location accessible to
a network attribute manager component of a network
integration unit, said network integration unit being
located below a network layer of a communications
protocol stack operating in a stationary network unit,
said stationary network unit being addressable from
said mobile network unit through both of said first
physical network and said different physical network,
and wherein said stored network attributes comprise:
said single network layer address of said mobile network unit; a collection of entries for one or more
physical networks for which said mobile unit is
registered, each of said entries comprising a network
layer address of said physical network and authentication information to be used for said mobile network
unit in said physical network, and wherein said first
physical network and said different physical network
may be represented in said collection; and a currently
active physical network attribute, identifying in which
of said one or more physical networks said mobile
network unit is located at a corresponding point in time;

sending a first message from said mobile network unit to
said stationary unit upon activation of said mobile
network unit, said first message informing said network
attribute manager of an initial one of said collection of
entries whose network layer address is to be used as
said currently active physical network attribute,
wherein said initial one represents said first physical
network;

sending a second message from said mobile network unit
to said stationary unit upon said change from said first
physical network to said different physical network,
said second message informing said network attribute
manager of a different one of said collection of entries
whose network layer address is to be used as said
currently active physical network attribute, wherein
said different one represents said different physical
network;

updating, by said network attribute manager in response
to receiving either of said first or said second message,
said currently active physical network attribute;

receiving, by a flow control component of said network
integration unit, a request to send data from an application executing in said stationary network unit to said
mobile network unit, said request specifying said single
network layer address as a destination address;

retrieving, by said flow control component from said
network attribute manager in response to said
receiving, said currently active physical network
attribute for said mobile network unit; and sending said data using a network address portion of said
currently active physical network attribute instead of
said single network layer address.

7. The method as claimed in claim 6, further comprising
the step of authenticating, by an authenticating component
of said network integration unit, said mobile network unit
using said stored authentication information for a selected
one of said one or more physical networks represented by
said currently active physical network attribute in response
to a first liking attempt by said mobile network unit to said
selected one, said authenticating step occurring before said
updating step.

8. The method as claimed in claim 6, wherein said
updating step updates said currently active physical network
attribute to an undefined value to prevent communication with said mobile network unit when said different one in said second message is not represented in said collection.

9. The method as claimed in claim 7, further comprising the steps of:

detecting, by said network attribute manager, that too much time has passed since said authenticating step completed; and updating, in response to said detecting, said currently active physical network attribute to said undefined value.

10. The method as claimed in claim 6, wherein said single network address is an Internet protocol address, said Internet protocol address comprised of a network identifier and a host identifier.

11. A method of providing seamless roaming for a mobile network unit by enabling said mobile network unit to be addressed by a single network layer address even though said mobile network unit changes from a first physical network to a different physical network, comprising the steps of:

determining, in said network integration unit, where to send output data addressed to said simple network layer address of said mobile network unit, comprising the steps of:

storing a plurality of network attributes related to said mobile network unit in a storage location accessible to a network attribute manager component of a network integration unit, said network integration unit being located below a network layer of a communications protocol stack operating in a stationary network unit, said stationary network unit being addressable from said mobile network unit through both of said first physical network and said different physical network, and wherein said stored network attributes comprise: said single network layer address of said mobile network unit; a collection of entries for one or more physical networks for which said mobile unit is registered, each of said entries comprising a network layer address of said physical network and authentication information to be used for said mobile network unit in said physical network, and wherein said first physical network and said different physical network may be represented in said collection; and a currently active physical network attribute, identifying in which of said one or more physical networks said mobile network unit is located at a corresponding point in time;

updating, by said network attribute manager in response to receiving either of a first message or a second message, said currently active physical network attribute;

receiving, by a flow control component of said network integration unit, a request to send data from an application executing in said stationary network unit to said mobile network unit, said request specifying said single network layer address as a destination address;

retrieving, by said flow control component from said network attribute manager in response to said receiving, said currently active physical network attribute for said mobile network unit; and sending said data using a network address portion of said currently active physical network attribute instead of said single network layer address; and notifying said network integration unit, by said mobile network unit, of a current network location of said mobile network unit, comprising the steps of;

sending said first message from said mobile network unit to said stationary network unit upon activation of said mobile network unit, said first message informing said network attribute manager of an initial one of said collection of entries whose network layer address is to be used as said currently active physical network attribute, wherein said initial one represents said first physical network; and sending said second message from said mobile network unit to said stationary network unit upon said change from said first physical network to said different physical network, said second message informing said network attribute manager of a different one of said collection of entries whose network layer address is to be used as said currently active physical network attribute, wherein said different one represents said different physical network.

12. A method of providing seamless roaming for a mobile network unit by enabling said mobile network unit to be continuously addressed by a single network layer address, comprising the steps of:

storing a network address of a currently active physical network for said mobile network unit;

receiving a message from said mobile network unit when said mobile network unit passes from a coverage area of said currently active physical network to a different physical network;

updating, in response to said receiving, said stored network address; and using said stored network address to send data addressed to said single network layer address instead of using said single network layer address.

* * * * *